(12) United States Patent
Hsiung

(10) Patent No.: US 10,754,155 B2
(45) Date of Patent: Aug. 25, 2020

(54) BACKLIGHT DEVICE

(71) Applicant: SITRONIX TECHNOLOGY CORP., Jhubei (TW)

(72) Inventor: Chuan-Pin Hsiung, Jhubei (TW)

(73) Assignee: Sitronix Technology Corp., Jhubei, Hsinchu County (TW)

( * ) Notice: Subject to any disclaimer, the term of this patent is extended or adjusted under 35 U.S.C. 154(b) by 0 days.

(21) Appl. No.: 16/477,703

(22) PCT Filed: Jan. 15, 2018

(86) PCT No.: PCT/CN2018/072584
§ 371 (c)(1),
(2) Date: Jul. 12, 2019

(87) PCT Pub. No.: WO2018/130214
PCT Pub. Date: Jul. 19, 2018

(65) Prior Publication Data
US 2019/0361238 A1 Nov. 28, 2019

Related U.S. Application Data

(60) Provisional application No. 62/445,933, filed on Jan. 13, 2017.

(51) Int. Cl.
*B64D 47/06* (2006.01)
*F21V 5/00* (2018.01)
(Continued)

(52) U.S. Cl.
CPC ........ *G02B 27/0149* (2013.01); *F21V 29/503* (2015.01); *F21V 29/763* (2015.01);
(Continued)

(58) Field of Classification Search
CPC ............ B60K 35/00; B60K 2370/1529; B60K 2370/167; B60K 2370/33; F21S 8/00;
(Continued)

(56) References Cited

U.S. PATENT DOCUMENTS

2015/0234188 A1  8/2015  Lee

FOREIGN PATENT DOCUMENTS

CN  101135430 A  3/2008
CN  201487743 U  5/2010
(Continued)

OTHER PUBLICATIONS

Search Report Issued by a Foreign Patent Office.
International Search Report Issued by a Foreign Patent Office (2019-559151).

*Primary Examiner* — Jason M Han
(74) *Attorney, Agent, or Firm* — Rosenberg, Klein & Lee

(57) ABSTRACT

The present invention provides a backlight device, which comprises a plurality of optical devices and a plurality of backlight plates. The plurality of backlight plates include light sources, respectively, and are disposed at the light inlets of the plurality of optical devices. Then the beams of the light sources can be incident to the plurality of optical devices through the light inlets and reflected to the light outlets of the plurality of optical devices to form a backlight source for a display panel. The plurality of optical devices extend from the light outlets beyond the opposite surface of the display panel. By distributing optical paths, the spaces required for the optical paths can be reduced.

14 Claims, 9 Drawing Sheets

(51) Int. Cl.
*G09F 13/18* (2006.01)
*G02B 27/01* (2006.01)
*F21V 29/503* (2015.01)
*F21V 29/76* (2015.01)
*B60K 35/00* (2006.01)

(52) U.S. Cl.
CPC ...... *B60K 35/00* (2013.01); *B60K 2370/1529* (2019.05); *B60K 2370/167* (2019.05); *B60K 2370/33* (2019.05); *G02B 27/0101* (2013.01); *G02B 2027/015* (2013.01)

(58) Field of Classification Search
CPC ......... F21V 7/00–10; F21V 19/00–007; F21V 29/503–777; G02B 27/01–0149
USPC ....... 362/249.02, 296.01, 297, 555, 559–561
See application file for complete search history.

(56) References Cited

FOREIGN PATENT DOCUMENTS

| | | |
|---|---|---|
| CN | 201599655 U | 10/2010 |
| CN | 101956925 A | 1/2011 |
| CN | 102620188 A | 8/2012 |
| CN | 103836523 A | 6/2014 |
| CN | 204650102 U | 9/2015 |
| CN | 105278161 A | 1/2016 |
| CN | 205003416 U | 1/2016 |
| CN | 205121115 U | 3/2016 |
| CN | 205424587 U | 8/2016 |
| JP | 2005214790 A | 8/2005 |
| JP | 2005338325 A | 12/2005 |
| JP | 2007121994 A | 5/2007 |
| JP | 2010020941 A | 1/2010 |
| JP | 2015170415 A | 9/2015 |
| WO | 2016092221 A1 | 6/2016 |

BACKLIGHT DEVICE

FIELD OF THE INVENTION

The present invention relates generally to a backlight device, and particularly to a backlight device that provides a backlight source to a display panel.

BACKGROUND OF THE INVENTION

As the optic and electronic technologies advance, backlight devices are continuously developed in various applications in life, for example, projectors and LCD displays. Nowadays, head up displays (HUDs) for vehicles are developed and applied extensively to assist drivers. With them, a driver doesn't need to bow his head to view the dashboard. Instead, the important driving information can be seen in the normal visual field. By reducing the frequency of checking the dashboard, the interruption of attention can be avoided, and the control of the status and consciousness will not be lost. Consequently, the driving safety can be improved. HUDs can integrate and replace various traditional dashboards such as speedometers, fuel meters, and status indicators. Normal HUDs require backlight devices before images can be displayed.

In general, backlight devices and HUDs have to share a limited space for providing optical images. Unfortunately, normal backlight device requires larger space for optical reflection, which makes the overall size increase. Besides, the heat dissipation structure of backlight devices also occupies greater space. In addition to increasing the manufacturing costs, once the size is too large, it is difficult to design HUD products into vehicles. Accordingly, size, costs, and design convenience are still the challenges for manufacturers.

To sum up, to solve the technical drawbacks as described above, the present invention provides a backlight device. By using a plurality of light sources incident to a plurality of optical devices, the optical space needed by the light sources can be distributed and hence reducing the overall size of the structure. Thereby, the equipment costs can be lowered, and the design convenience can be enhanced. In addition, a preferred dissipation structure can be provided to a limited space.

SUMMARY

An objective of the present invention is to provide a backlight device. By using a plurality of optical devices to transport the light by a plurality of light sources, the optical space needed by the light sources can be distributed.

An objective of the present invention is to provide a backlight device. By using a plurality of optical channels to transport the light by a plurality of light sources, the heat dissipation space of the light sources can be distributed and hence reducing the overall size.

The present invention relates to a backlight device used for providing a backlight source to a display panel. The backlight device comprises a plurality of optical devices and a plurality of backlight plates. The plurality of optical devices include a light inlet and a light outlet, respectively. The plurality of light outlets of the plurality of optical devices face the display panel. The plurality of optical devices extend from the plurality of light outlets beyond an opposite surface of the display panel. The plurality of backlight plates include plurality of light sources, respectively, and are disposed at the light inlets of the plurality of optical devices, respectively. The beams from the plurality of light sources are incident to the plurality of optical devices via the plurality of light inlets. The plurality of optical devices reflect the beams to the plurality of light outlets and the beams converge to become the backlight source. Accordingly, by using the plurality of optical devices to distribute the space needed by the plurality of light sources, the overall size can be reduced.

DETAILED DESCRIPTION

Figure 1:
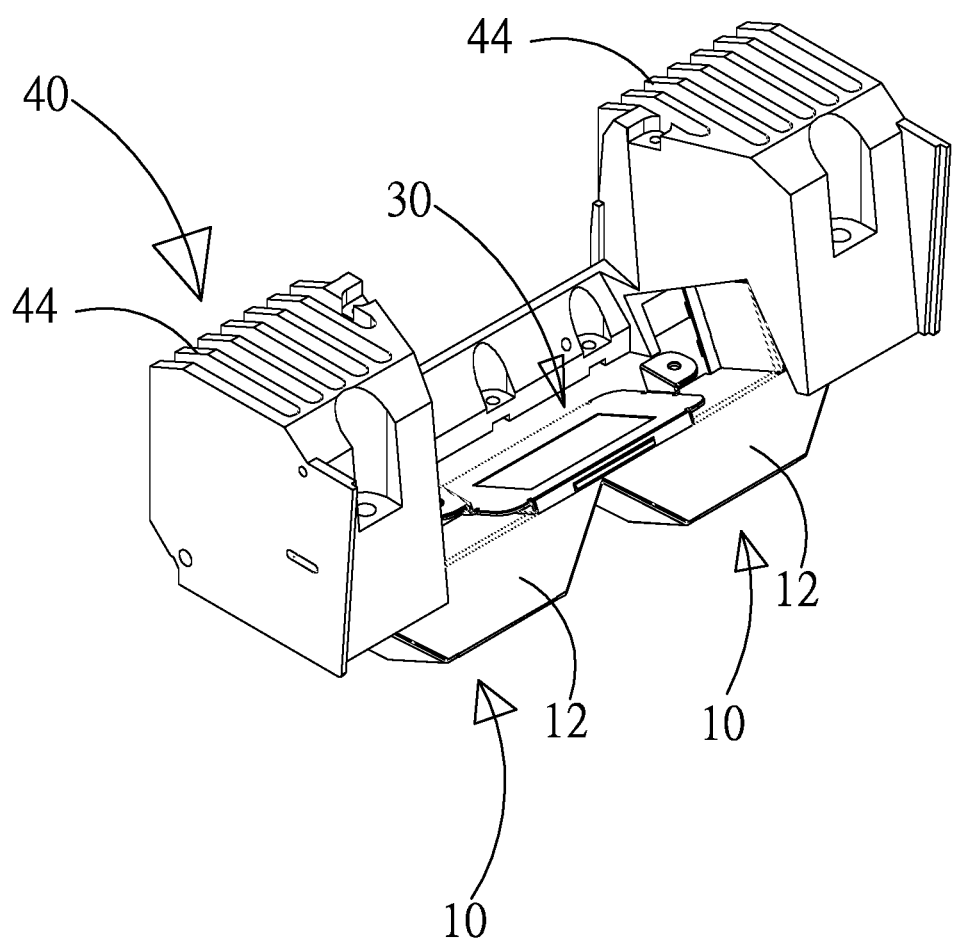
FIG. 1 shows a stereoscopic diagram of the backlight device according to an embodiment of the present invention.

Please refer to FIG. 1 to FIG. 4, which show a stereoscopic diagram, an exploded view, another exploded view, and a schematic diagram of the optical path of the backlight device according to an embodiment of the present invention. As shown in FIG. 1 to FIG. 4, the backlight device 1 according to the embodiment of the present invention comprises a plurality of optical devices 10 and a plurality of backlight plates 20. Each optical device 10 according to the present embodiment includes a body 12, a first optical component 14, and a second optical component 16. The body 12 includes a light inlet 12a and a light outlet 12b. The backlight plate 20 according to the present embodiment includes a plurality of light sources 22. The backlight plate 20 is disposed at the light inlet 12a of the body 12 of the optical device 10. The first optical component 14 and the second optical component 16 are disposed in the body 12.

The first optical component 14 and the second optical component 16 according to the present embodiment can be reflection mirrors in the body 12. Alternatively, they can be reflection mirrors with smooth surfaces formed by coated glue or plated film on the inner surface of the body 12. The first optical component 14 is disposed in the body 12 and located on an optical projection path L1 of the plurality of light sources 22 for providing the beams L produced by the light sources 22. The second optical component 16 is located on a first optical reflection path L2 of the first optical component 14 for providing the beams reflected by the first optical component 14. In addition, the second optical component 16 reflects the beams L to the light outlet 12b for forming a backlight source BL. In other words, the beams L of the plurality of light sources 22 are incident from the plurality of light inlets 12a to the plurality of optical devices 10, so that the plurality of optical devices 10 can reflect the beams L to the plurality of light outlets 12b. Then the beams L can converge to become the backlight source BL.

Moreover, a display panel structure 30 is located on a second optical reflection path L3 of the second optical component 16. Namely, the display panel structure 30 is located at the light outlet 12b. Thereby, after the backlight source BL passes through the light outlet 12b, it travels to the display panel 32 of the display panel structure 30. The bodies 12 of some optical devices can extend from the light outlet 12b to both sides (opposite sides) of the display panel structure 30 to distribute and extend the space required for beam transport. Thereby, the space needed for the optical reflection of the backlight device 1 can be reduced.

Figure 2:
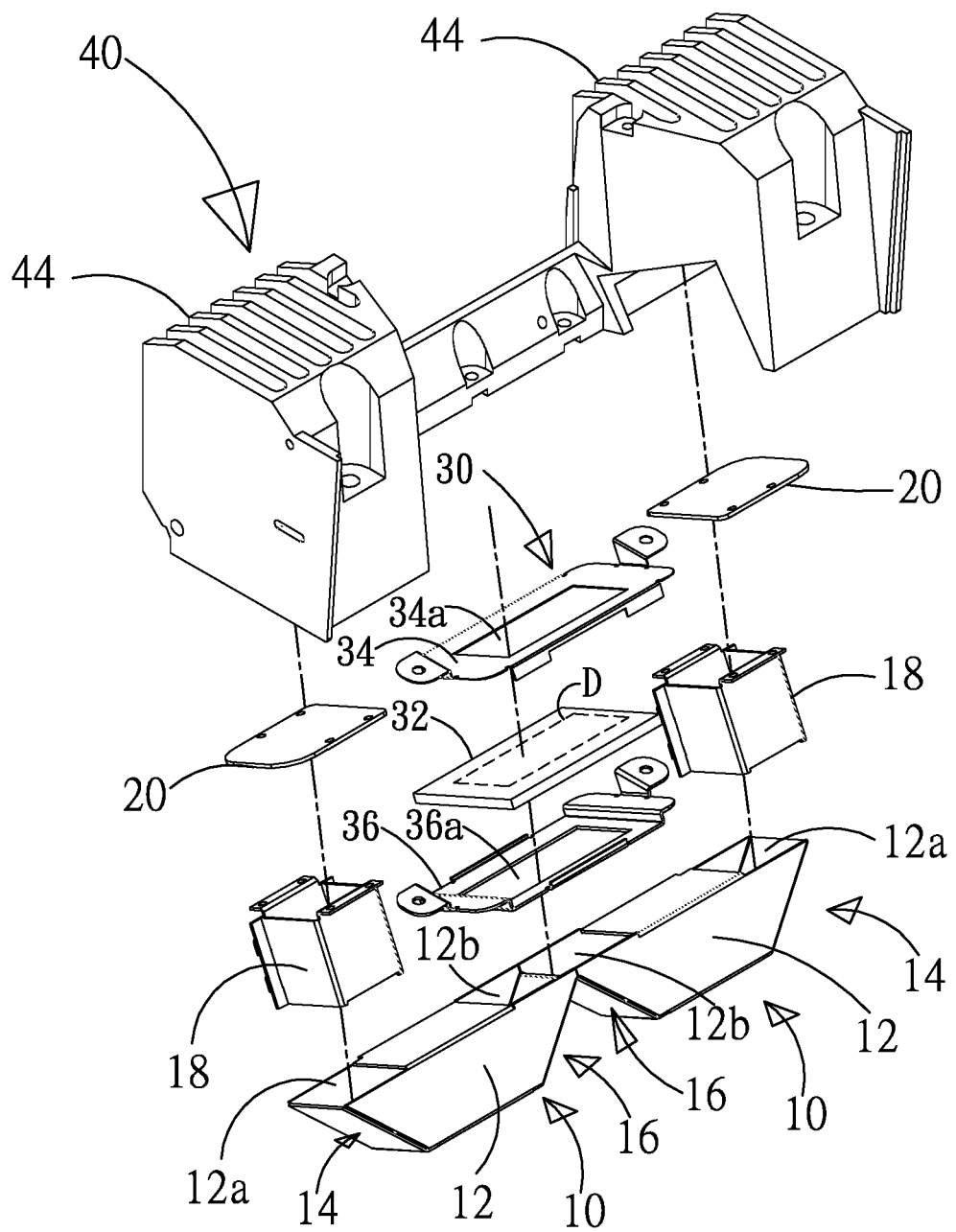
FIG. 2 shows an exploded view of the backlight device according to an embodiment of the present invention.
Figure 3:
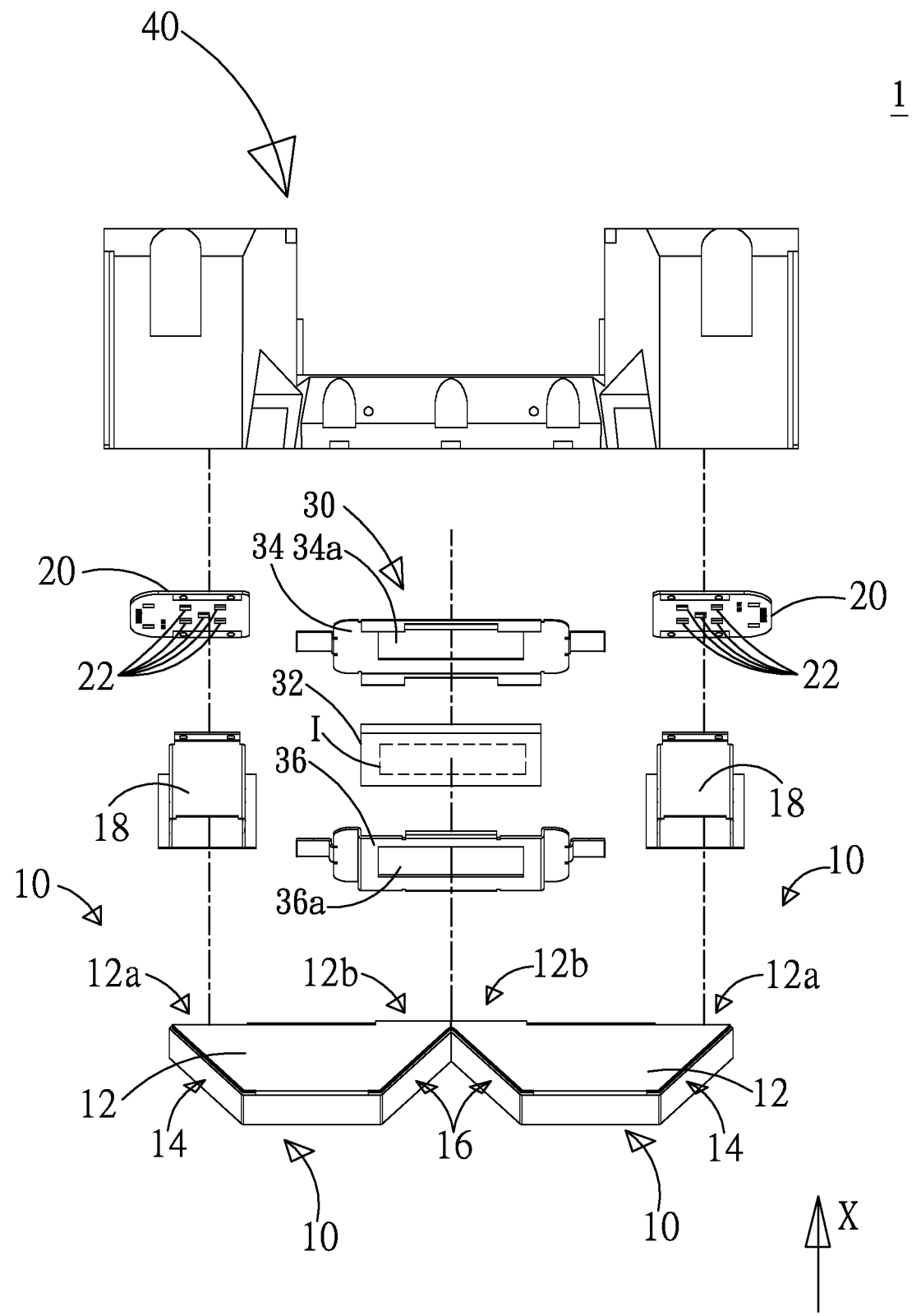
FIG. 3 shows another exploded view of the backlight device according to an embodiment of the present invention.
Figure 4:
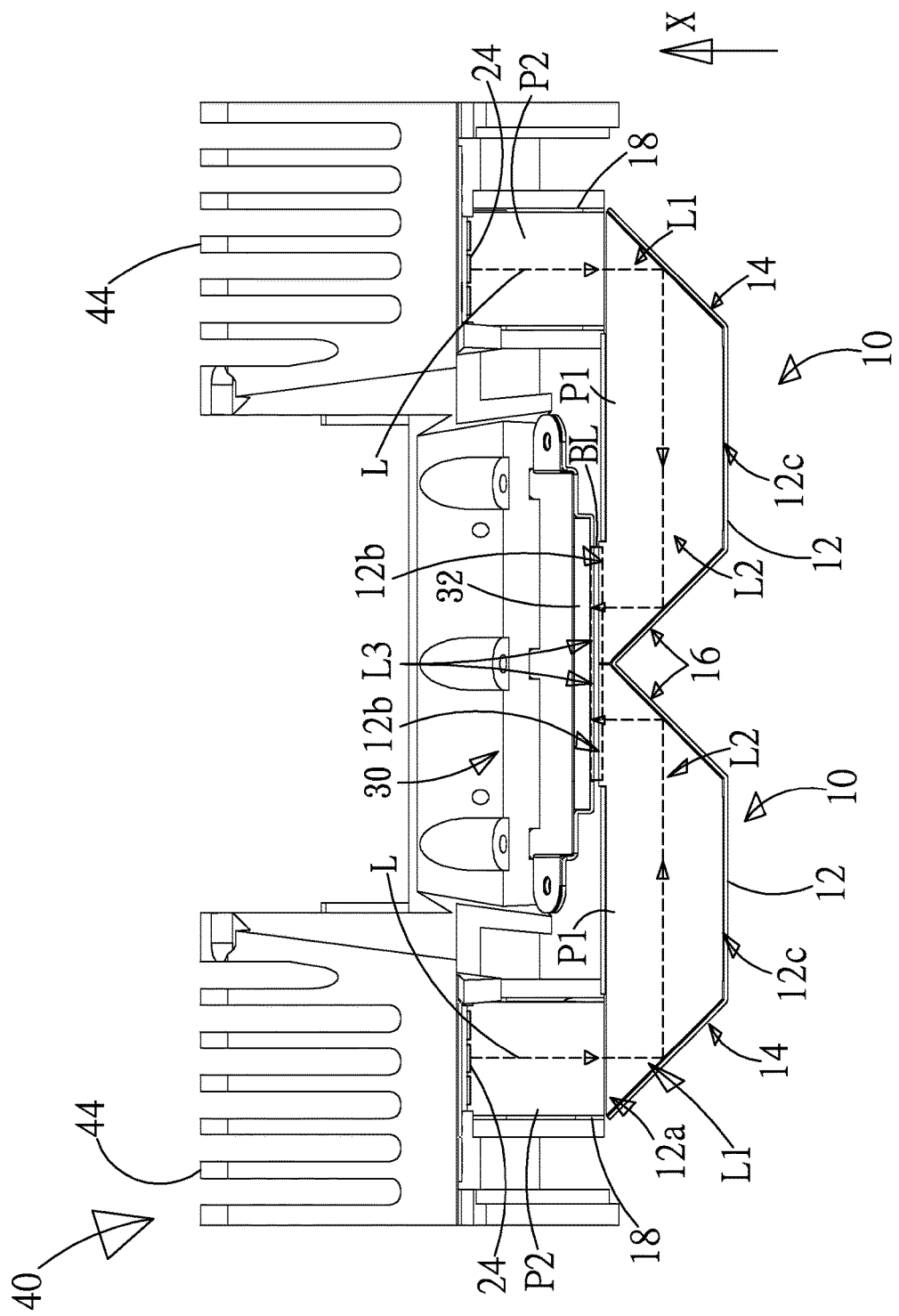
FIG. 4 shows a schematic diagram of the optical path of the backlight device according to an embodiment of the present invention.

In addition, the display panel structure 30 is disposed at the light outlet 12b of the body 12 of the optical device 10. The display panel structure 30 further includes a top fixing member 34 and a bottom fixing member 36. The top fixing member 34 includes a first opening 34a; the bottom fixing member 36 includes a second opening 36a. The top fixing member 34 and the bottom fixing member 36 sandwich the display panel 32 and fix the display panel 32 on the body 12. Besides, the display region D is exposed through the first opening 34a (as shown in FIG. 2) and the incident region I is exposed through the second opening 36a (as shown in FIG. 3). Thereby, the backlight source BL according to the present embodiment is incident to the display panel 32 through the incident region I. Then the display region D of the display panel 32 can display images according to the beams from the backlight source BL.

According to an embodiment of the present invention, the light sources 22 can be LEDs. They can further be high-power LEDs. As shown in FIG. 1 to FIG. 4, the backlight device 1 according to the present invention can further comprise a plurality of heat dissipation structures 40 having a plurality of heat dissipation fins 44. The backlight plates are wedged in the heat dissipation structures. The stereoscopic diagram in FIG. 1 does not disclose the structure of the backlight plates 20. In addition, the backlight device 1 according to the present embodiment can be applied to HUDs. Thereby, in general, the display region D of the display panel 32 is disposed along a vertical direction X and faces up for projecting images to the windshield. Noteworthily, the heat dissipation structure 40 according to the present embodiment is disposed on the backlight plate 20 along the vertical direction X. Thereby, the heat produced by the light source 22 and the backlight plate 20 can be conducted to the heat dissipation structure 40 easily according to the natural principle of upward convection of heat flows, enabling preferred heat dissipation performance. Furthermore, the optical devices 10 are designed to be distributed. Given the distributed arrangement of the backlight plates 20 and the light sources 22, the heat dissipation spaces of the light sources 22 are distributed and hence further improving the heat dissipation performance. The plurality of optical devices 10 according to the present embodiment extend on the plane perpendicular to the vertical direction X and toward the opposite side of the display panel 32. The plurality of light inlets 12a of the plurality of optical device 10 are also disposed along the vertical direction X.

Besides, according to the present embodiment, a first light collecting hood 12c is disposed in the body 12 of the optical device 10. A second light collecting hood 18 is disposed between the light inlet 12a of the body 12 and the backlight plate 20. The first light collecting hood 12c is located between the first optical component 14 and the second optical component 16. The first light collecting hood 12c includes a first optical channel P1 opposing to the first optical component 14 and the second optical component 16. The second light collecting hood 18 includes a second optical channel P2 opposing to the plurality of light sources 22 and the first optical component 14. Thereby, the situation of light dispersion between the light inlet 12a and the backlight plate 20 and between the first optical component 14 and the second optical component 16 can be alleviated.

According to the above description, the plurality of backlight plates 20 of the backlight device 1 according to the present embodiment are located on both sides of the display panel structure 30, respectively. In other words, the light sources 22 of the backlight plates 20 are distributed to the plurality of optical devices 10. The bodies 12 of the plurality of optical device 10 can extend to the both sides of the display panel structure 30. Thereby, the space of backlight device 1 in the vertical direction X will not be occupied. Since the space needed for optical path is distributed and extended, the space required for the optical reflection of the backlight device 1 is reduced and thus reducing the overall size of the backlight device 1. Besides, the heat dissipation structures 40 are disposed on the backlight plates 20. By using the natural upward convection of heat flows and the distributed design of the optical devices 10, the heat dissipation space of the light sources 22 is distributed and not concentrated, and hence giving preferred heat dissipation performance.

Please refer to FIG. 5 to FIG. 8, which show a stereoscopic diagram, an exploded view, another exploded view, and a schematic diagram of the optical path of the backlight device according to another embodiment of the present invention. The difference between the backlight device 100 according to the present embodiment and the backlight device 1 according to the previous one is that the body 12 in the optical device 10 of the backlight device 1 includes a first optical component 14 and a second optical component 16. Contrarily, the body 112 in the optical device 110 of the backlight device 100 includes an optical device 114 only. In addition, the backlight plate 20 and the display panel structure 30 according to the previous embodiment are located on the same side of the optical device 10, while the backlight plate 120 and the display panel structure 130 according to the present embodiment are located on different sides of the optical device 100. In particular, the backlight plate 120 is disposed on one side of the optical device 110.

As shown in FIG. 5 to FIG. 8, the backlight device 100 according to the present embodiment comprises a plurality of optical devices 110 and a plurality of backlight plates 120. Each optical device 110 according to the present embodiment includes a body 112 and an optical device 11. The body 112 includes a light inlet 112a and a light outlet 112b. The light inlet 12a and the light outlet 12b according to the previous embodiment are located on the same side of the body 12. Contrarily, the light inlet 112a and the light outlet 112b according to the present embodiment are located on different sides of the body 112. The plurality of light inlets 112a of the plurality of optical device 110 are disposed along the direction perpendicular to the vertical direction X. The plurality of optical devices 110 according to the present embodiment extend on the plane perpendicular to the vertical direction X and toward the opposite side of the display panel 32. The backlight plate 120 according to the present embodiment includes plurality of light sources 122. The backlight plate 120 is disposed at the light inlet 112a of the body 112 of the optical device 110. The optical device 114 is disposed in the body 112. The backlight plate 120 according to the present invention is disposed on one side of the optical device 110. Thereby, the light sources 122 of the backlight plate 120 are straight and emit the beam L toward the light inlet 112a.

The optical device 114 according to the present embodiment can be a reflection mirror in the body 112. Alternatively, it can be a reflection mirror with a smooth surface formed by coated glue or plated film on the inner surface of the body 112. The optical device 114 is disposed in the body 112 and located on an optical projection path L1a of the plurality of light sources 122 for reflecting the beams L produced by the light sources 122. The optical device 114 guides the beams L to the light outlet 112b along an optical reflection path L2a for forming a backlight source BL. Accordingly, the light sources 122 and the light inlet 112a are located on the side of the optical device 110. The beams L from the light sources 122 experience only one reflection. Namely, the beams L are reflected by the optical device 114 to the light outlet 112b.

Moreover, a display panel structure 130 is located on an optical reflection path L2a of the optical device 114. Namely, the display panel structure 130 is located at the light outlet 112b. Thereby, the backlight device 100 can provide the backlight source BL to the display panel 132 of the display panel structure 130. Besides, the bodies 112 of the optical devices 110 can extend from the light outlet 112b to both sides of the display panel structure 130. By disposing the plurality of backlight plates 120 via the light inlet 112a on one side of the optical device 110, the space required for beam transport for the light sources 122 can be distributed and extended. Thereby, the space needed for the optical reflection of the backlight device 1 can be reduced.

In addition, the display panel structure 130 is disposed at the light outlet 112b of the body 112 of the optical device 110. The display panel structure 130 further includes a top fixing member 134. The top fixing member 134 includes a first opening 134a and fixes the display panel 132 on the body 112. Besides, the display region D is exposed through the first opening 134a. According to the present embodiment, the display panel structure 130 does not include a bottom fixing member. Thereby, the display panel 132 according to the present embodiment uses the whole bottom surface 132a as the incident region for beams.

According to an embodiment of the present invention, the light sources 122 can be LEDs. They can further be high-power LEDs. As shown in FIG. 5 to FIG. 9, the heat dissipation structure 140 according to the present embodiment can extend upward along the vertical direction X. Thereby, the heat produced by the light sources 122 and the backlight plates 120 can be dissipated upward following the heat flow along the heat dissipation structure 140. Furthermore, the optical devices 110 are designed to be distributed. Given the distributed arrangement of the backlight plates 120 and the light sources 122, the heat dissipation spaces of the light sources 122 are distributed and hence further improving the heat dissipation performance.

Besides, according to the present embodiment, a light collecting hood 112c is disposed in the body 112 of the optical device 110. The light collecting hood 112c includes an optical channel P opposing to the plurality of light sources 122 and the optical device 114. Thereby, the situation of light dispersion between the light inlet 112a and the backlight plate 120 can be alleviated.

Figure 5:
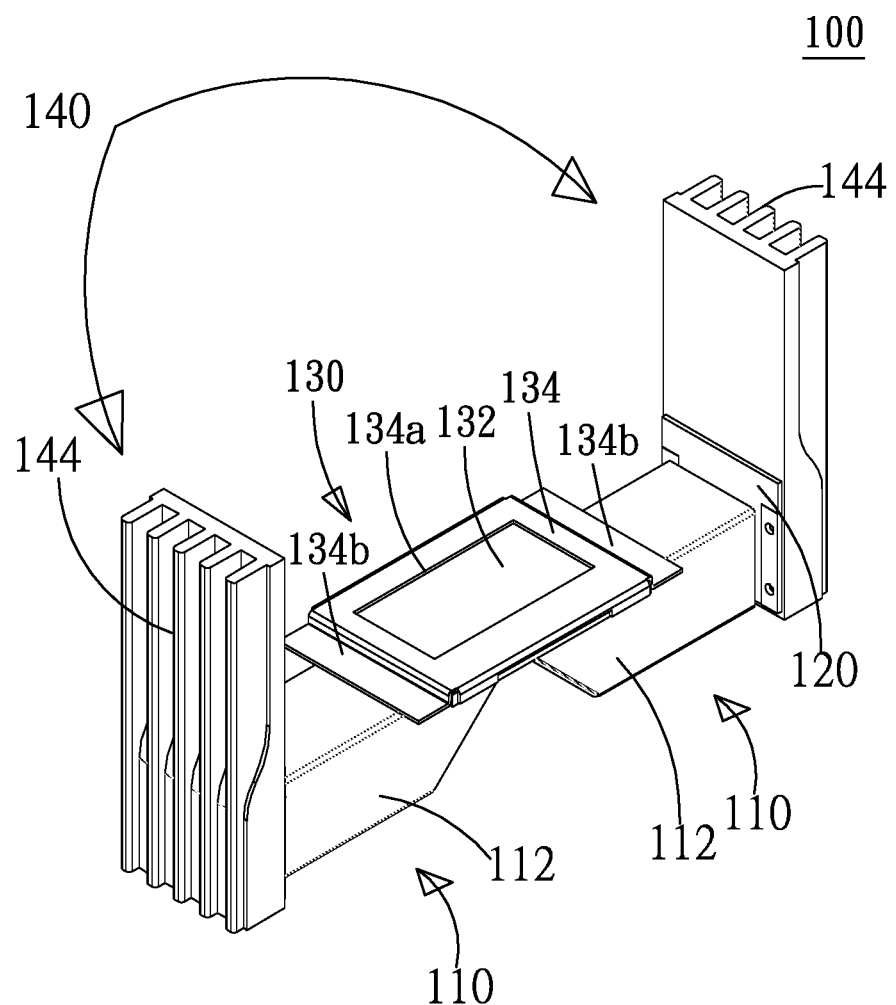
FIG. 5 shows a stereoscopic diagram of the backlight device according to another embodiment of the present invention.
Figure 6:
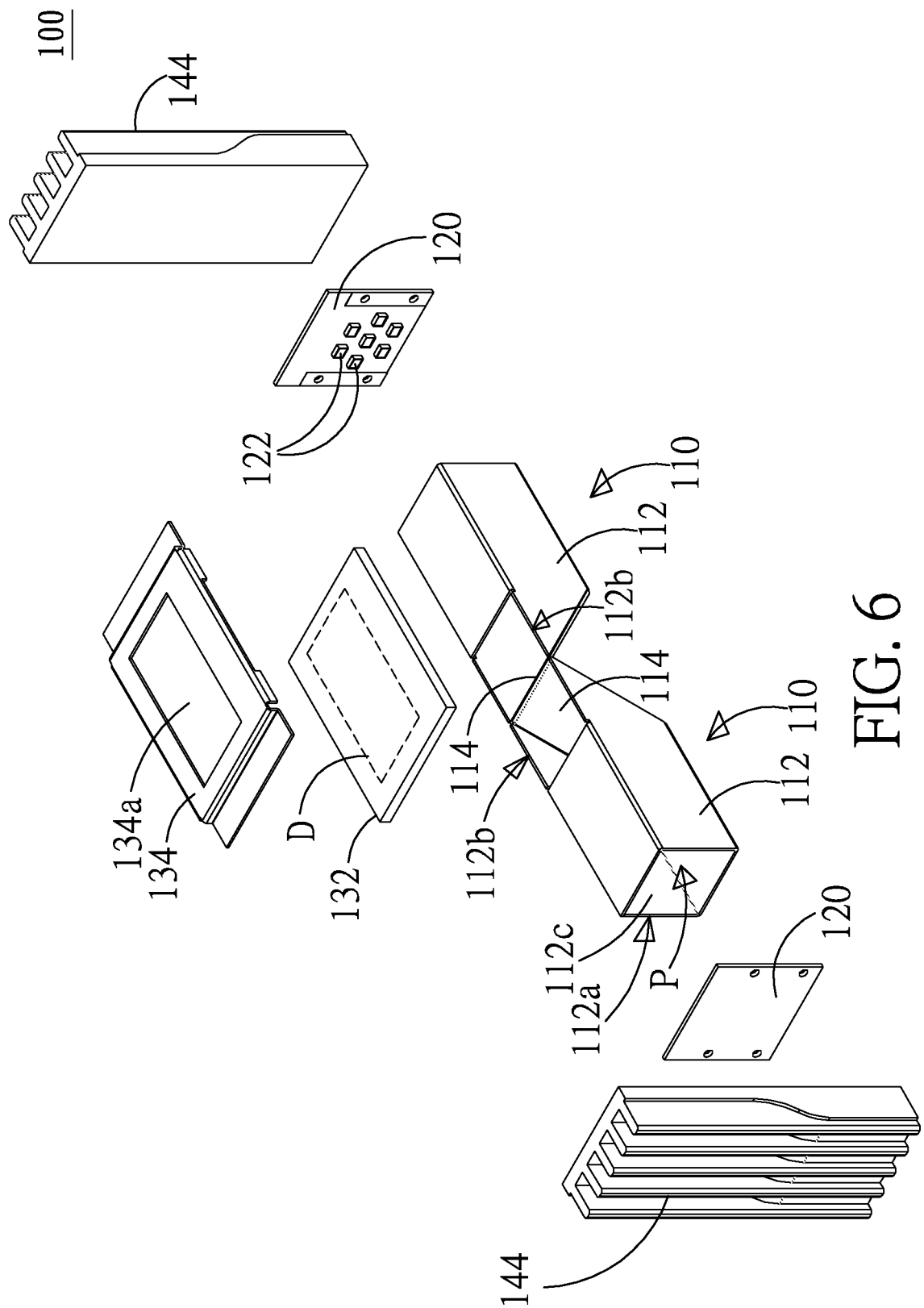
FIG. 6 shows an exploded view of the backlight device according to another embodiment of the present invention.
Figure 7:
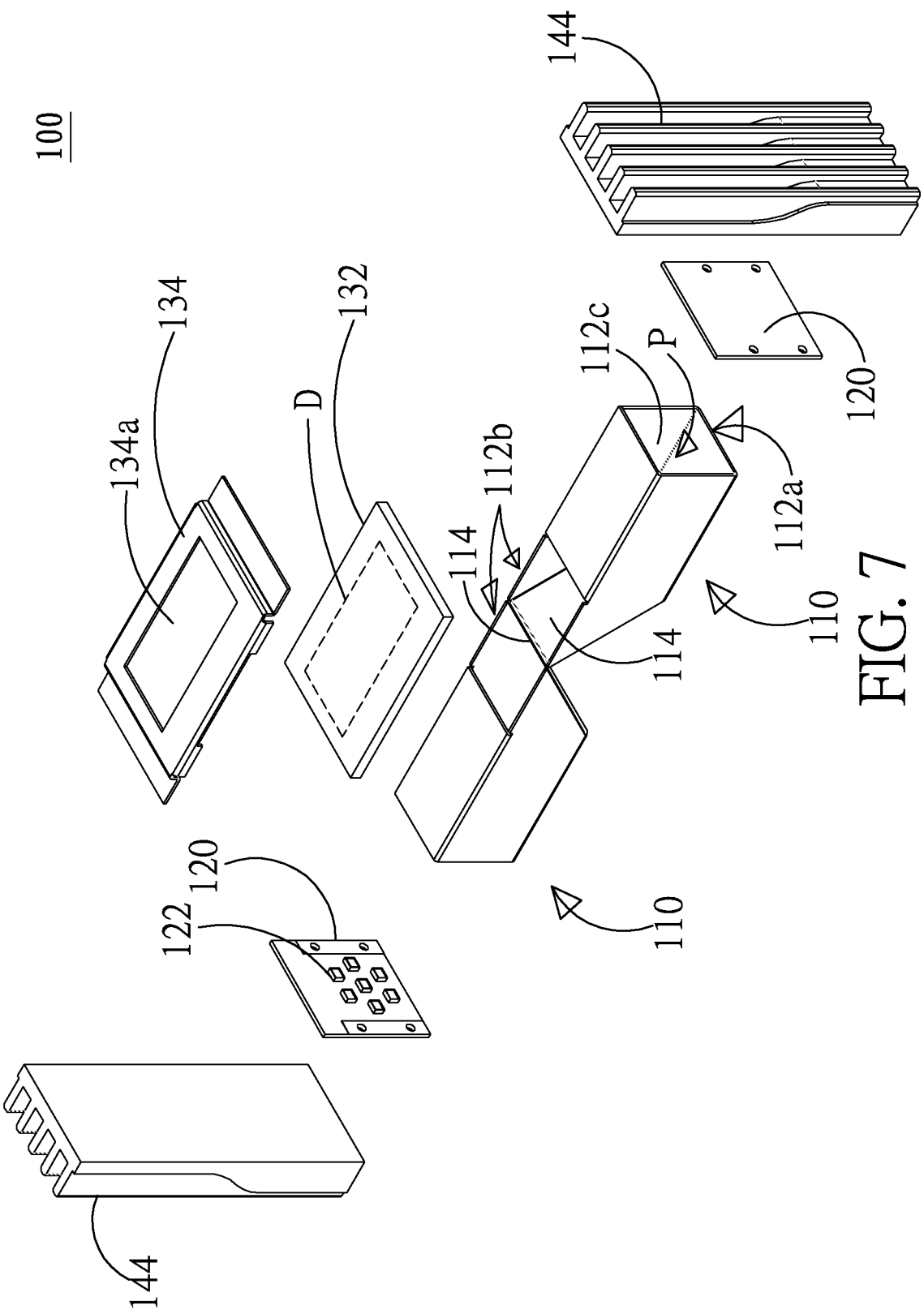
FIG. 7 shows another exploded view of the backlight device according to another embodiment of the present invention.
Figure 8:
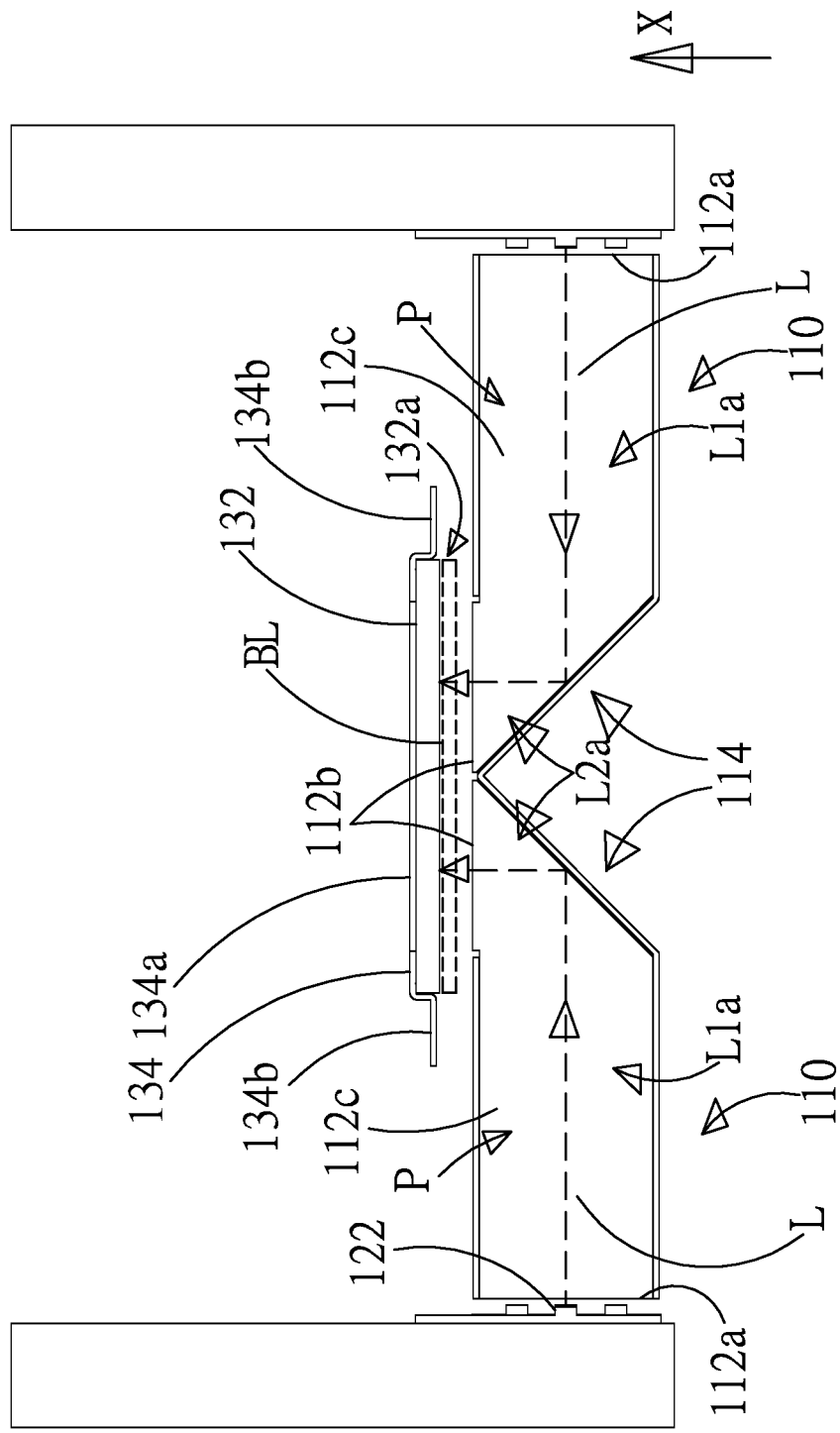
FIG. 8 shows a schematic diagram of the optical path of the backlight device according to another embodiment of the present invention.
Figure 9:
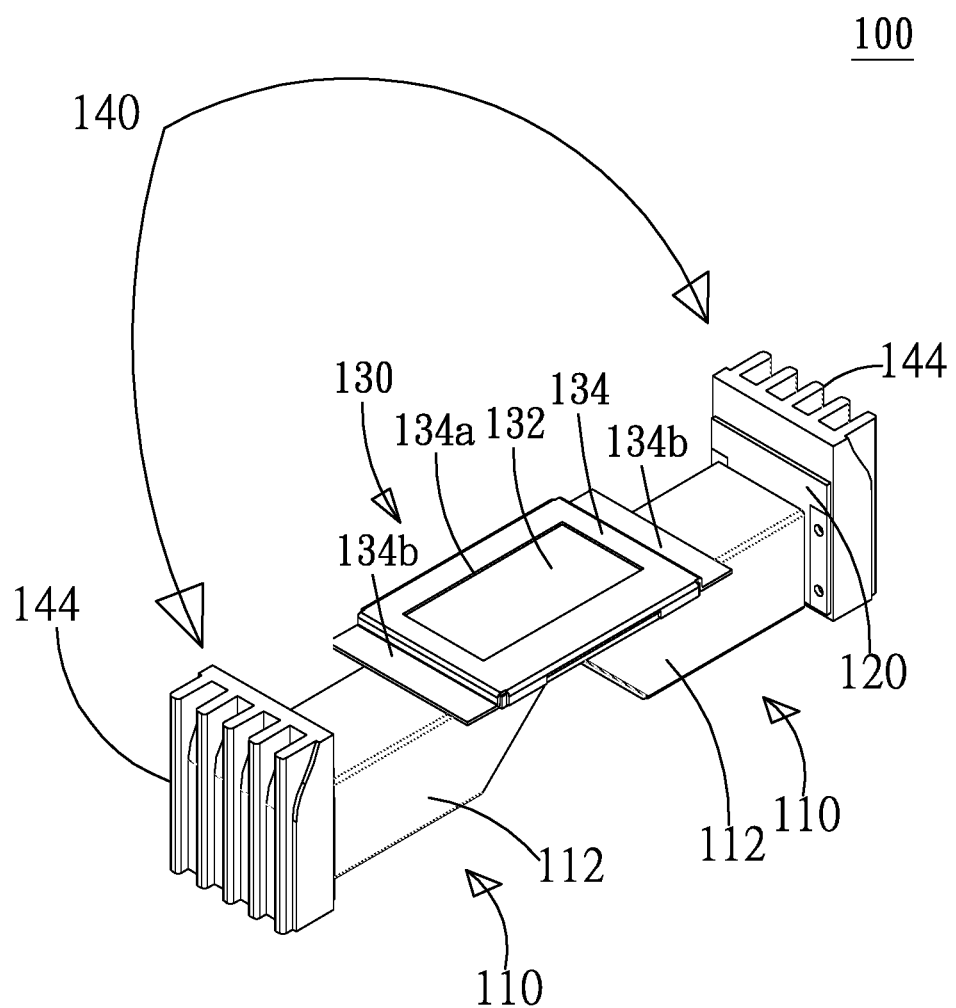
FIG. 9 shows a stereoscopic diagram of the backlight device according to another embodiment of the present invention.

Furthermore, as shown in FIG. 5 and FIG. 9, the height 0f the heat dissipation structure 140 in the backlight device 100 according to the present invention can be further reduced for reducing the overall height of the backlight device 100. Thereby, the overall size of the backlight device 100 can be reduced. In addition, the height 0f the heat dissipation structure 140 in the backlight device 100 can be increased for increasing the heat dissipation area of the heat dissipation structure 140.

The optical devices described above are assembling structures, in which the light outlets of two or more optical devices are assembled to form an output of a backlight source. Nonetheless, the optical device according to the present invention is not limited to the embodiment. A plurality of optical devices can be formed integrally.

According to the above embodiments, although two optical devices and two backlight plates are taken as examples, the present invention is not limited to the embodiments. Alternatively, three or more optical devices and backlight plates can be disposed according to practical design requirements.

To sum up, the backlight device according to the present invention comprises a plurality of optical devices corresponding to a plurality of backlights. The incident beams from the light inlets can be guided to pass through the optical channels in the plurality of optical device and converged at the light outlets and thus providing a backlight source to the display panel. By using the optical devices to distribute the spaces required for light guidance, the overall size of the backlight device can be reduced.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. A backlight device, providing a backlight source to a display panel, and comprising:
    a plurality of optical devices, including a light inlet and a light outlet, respectively, said plurality of light outlets of said plurality of optical devices facing said display panel, and said plurality of optical devices extending from said plurality of light outlets beyond an opposite surface of said display panel; and
    a plurality of backlight plates, including plurality of light sources, respectively, disposed at said light inlets of said plurality of optical devices, respectively, the beams of said plurality of light sources incident to said plurality of optical devices from said plurality of light inlets, and said plurality of optical devices reflecting said beams to said plurality of light outlets and converging to form said backlight source.

2. The backlight device of claim 1, wherein said plurality of optical devices include, respectively:
    a body;
    a first optical component, disposed in said body and located on an optical projection path of said plurality of light sources for reflecting said beams of said plurality of light sources; and
    a second optical component, disposed in said body and located on a first reflection path of said first optical component for reflecting said beams reflected from said first optical component to said display panel.

3. The backlight device of claim 2, further comprising:
    a first light collecting hood, disposed at said body and located between said first optical component and said second optical component, and including a first optical channel opposing to said first optical component and said second optical component;
a second light collecting hood, disposed between said backlight plate and said first optical component, and including a second optical channel opposing to said backlight plate and said first optical component.

4. The backlight device of claim 2, wherein said display panel includes a display region disposed facing up and along a vertical direction; and said light inlets of said plurality of optical devices are also disposed facing up and along said vertical direction.

5. The backlight device of claim 2, further comprising:
a heat dissipation structure, disposed on said plurality of backlight plates, and including a plurality of heat dissipation fins.

6. The backlight device of claim 5, wherein said display panel includes a display region disposed facing up and along a vertical direction; and said heat dissipation structure is located on said plurality of backlight plates.

7. The backlight device of claim 1, wherein said plurality of optical devices include, respectively:
a body;
an optical device, disposed in said body and located on an optical projection path of said plurality of light sources for reflecting said beams of said plurality of light sources to said display panel.

8. The backlight device of claim 7, further comprising:
a light collecting hood, disposed at said body and located between said backlight plate and said optical device, and including an optical channel opposing to said plurality of light sources and said optical device.

9. The backlight device of claim 7, wherein said display panel includes a display region disposed facing up and along a vertical direction; and said light inlets of said plurality of optical devices are disposed toward the opposite direction perpendicular to said vertical direction.

10. The backlight device of claim 7, further comprising:
a heat dissipation structure, disposed on said plurality of backlight plates, and including a plurality of heat dissipation fins.

11. The backlight device of claim 10, wherein said display panel includes a display region disposed facing up and along a vertical direction; and said heat dissipation structure extends upward along said vertical direction.

12. The backlight device of claim 1, wherein said display panel includes a display region disposed facing up and along a vertical direction; and said plurality of optical devices extend on the plane perpendicular to said vertical direction toward the opposite side of said display panel.

13. The backlight device of claim 1, wherein said plurality of optical devices are assembling structures.

14. The backlight device of claim 1, wherein said plurality of optical devices are formed integrally.

* * * * *